US010009154B2

(12) United States Patent
Sawai

(10) Patent No.: US 10,009,154 B2
(45) Date of Patent: *Jun. 26, 2018

(54) BASE STATION, TERMINAL APPARATUS, COMMUNICATION CONTROL METHOD AND RADIO COMMUNICATION SYSTEM

(71) Applicant: Sony Corporation, Tokyo (JP)

(72) Inventor: Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/246,002

(22) Filed: Aug. 24, 2016

(65) Prior Publication Data

US 2016/0366693 A1    Dec. 15, 2016

Related U.S. Application Data

(60) Continuation of application No. 14/518,338, filed on Oct. 20, 2014, now abandoned, which is a division of (Continued)

(30) Foreign Application Priority Data

Jan. 13, 2010    (JP) .................................. 2010-004564

(51) Int. Cl.
*H04L 5/00* (2006.01)
*H04L 1/00* (2006.01)
(Continued)

(52) U.S. Cl.
CPC ............ *H04L 5/001* (2013.01); *H04L 1/0001* (2013.01); *H04L 1/0071* (2013.01);
(Continued)

(58) Field of Classification Search
CPC .... H04W 72/085; H04L 5/0005; H04L 5/001; H04L 5/006; H04L 5/0007; H04L 5/0044; H04L 1/0001; H04L 1/0071
See application file for complete search history.

(56) References Cited

U.S. PATENT DOCUMENTS

2004/0121788 A1    6/2004  Moon et al.
2007/0121742 A1    5/2007  Tamaki et al.
(Continued)

FOREIGN PATENT DOCUMENTS

CN    1836391 A    9/2006
CN    101335732 A    12/2008
(Continued)

OTHER PUBLICATIONS

Office Action dated Nov. 22, 2016 in Japanese Patent Application No. 2015-255854.
(Continued)

*Primary Examiner* — Gary Mui
(74) *Attorney, Agent, or Firm* — Oblon, McClelland, Maier & Neustadt, L.L.P.

(57) ABSTRACT

To adaptively interleave in accordance with communication channel conditions. Provided is a base station performing radio communication with a terminal apparatus on a communication channel formed by integrating a plurality of component carriers, including a quality acquisition unit that acquires channel quality of the communication channel for each of the component carriers and an interleaver that interleaves data signals transmitted on the communication channel in accordance with at least one of the channel quality acquired by the quality acquisition unit and available situations of communication resources for each of the component carriers.

20 Claims, 13 Drawing Sheets

Related U.S. Application Data application No. 13/517,255, filed as application No. PCT/JP2011/050014 on Jan. 4, 2011, now Pat. No. 8,885,629.

(51) Int. Cl.
 *H04W 72/08* (2009.01)
 *H04W 88/08* (2009.01)

(52) U.S. Cl.
 CPC ............ *H04L 5/0005* (2013.01); *H04L 5/006* (2013.01); *H04W 72/085* (2013.01); *H04L 5/0007* (2013.01); *H04L 5/0044* (2013.01); *H04W 88/08* (2013.01)

(56) References Cited

U.S. PATENT DOCUMENTS

| | | |
|---|---|---|
| 2007/0162789 A1 | 7/2007 | Starr |
| 2010/0103919 A1 | 4/2010 | Murakami et al. |
| 2010/0296389 A1 | 11/2010 | Khandekar et al. |
| 2011/0090817 A1 | 4/2011 | Qu et al. |
| 2011/0255469 A1 | 10/2011 | Kishiyama et al. |
| 2012/0188886 A1 | 7/2012 | Chen et al. |

FOREIGN PATENT DOCUMENTS

| | | |
|---|---|---|
| EP | 2 019 529 A2 | 1/2009 |
| JP | 2001-168821 | 6/2001 |
| JP | 2004 179679 | 6/2004 |
| JP | 2006-237897 | 9/2006 |
| JP | 2007-135021 A | 5/2007 |
| JP | 5862718 B2 | 2/2016 |
| WO | WO 2009/098821 A1 | 8/2009 |

OTHER PUBLICATIONS

Johansson, K., et al., "Multi-Carrier HSPA Evolution," IEEE 69$^{th}$ Vehicular Technology Conference, pp. 1-5, (Apr. 26-29, 2009).

"LTE-Advanced and the Evolution to 4G Cellular Systems," Broadband Wireless Networking Lab, Total 7 Pages, (Jan. 5, 2010).

International Search Report dated Mar. 29, 2011 in PCT/JP11/50014 Filed Jan. 4, 2011.

Office Action dated Feb. 4, 2014 in the corresponding Japanese Patent Application No. 2010-004564.

Office Action dated Jul. 28, 2014 in Chinese Patent Application No. 201180005593.5 (with English translation) (15 pages).

Office Action dated Apr. 7, 2015 in Japanese Patent Application No. 2014-142079.

"Considerations on scheduling in carrier aggregation", ZTE, 3GPP TSG RAN WG2 Meeting #66bis, Jun. 29-Jul. 3, 2009, R2-093886, 5 pages.

Extended European Search Report dated Sep. 30, 2015 in Patent Application No. 11732823.7.

"Mapping of logical channels to component carriers", 3GPP TSG RAN WG2 #68, R2-096768, ZTE, XP 50391234 A, Nov. 9-13, 2009, pp. 1-9.

"MAC-to-physical-layer mapping issues for LTE-A", 3GPP TSG-RAN WG1 Meeting #55bis, R1-090512, NEC Group, XP 50318401 A, Jan. 12-16, 2009, 5 Pages.

"Evaluation of MAC to Physical Layer Mapping for Carrier Aggregation", 3GPP TSG-RAN WG1 Meeting #55bis, R1-090260, Panasonic, XP 50318187 A, Jan. 12-16, 2009, pp. 1-9.

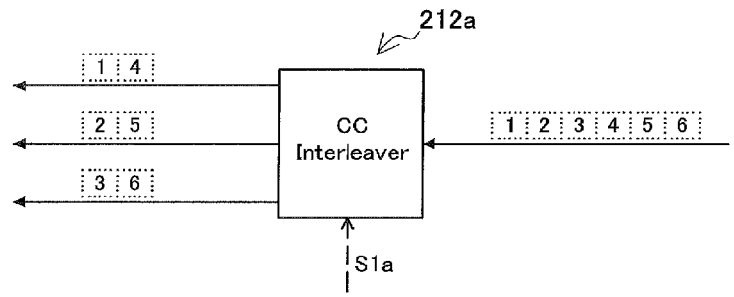
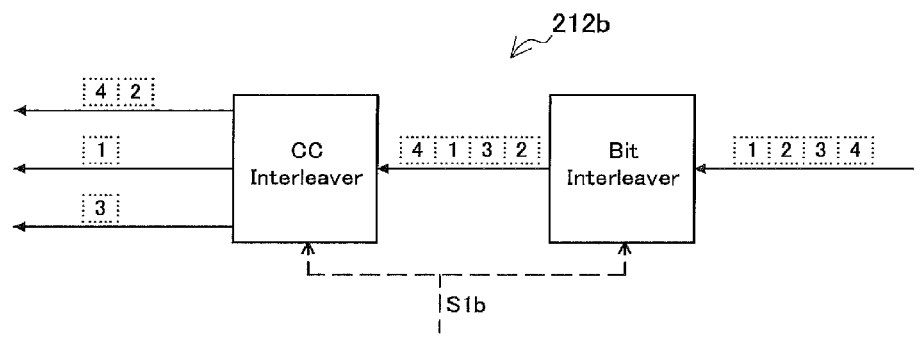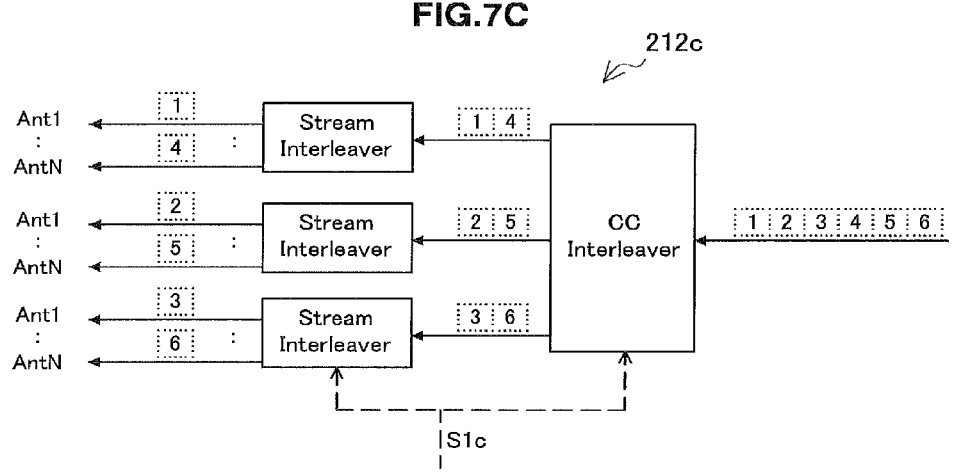

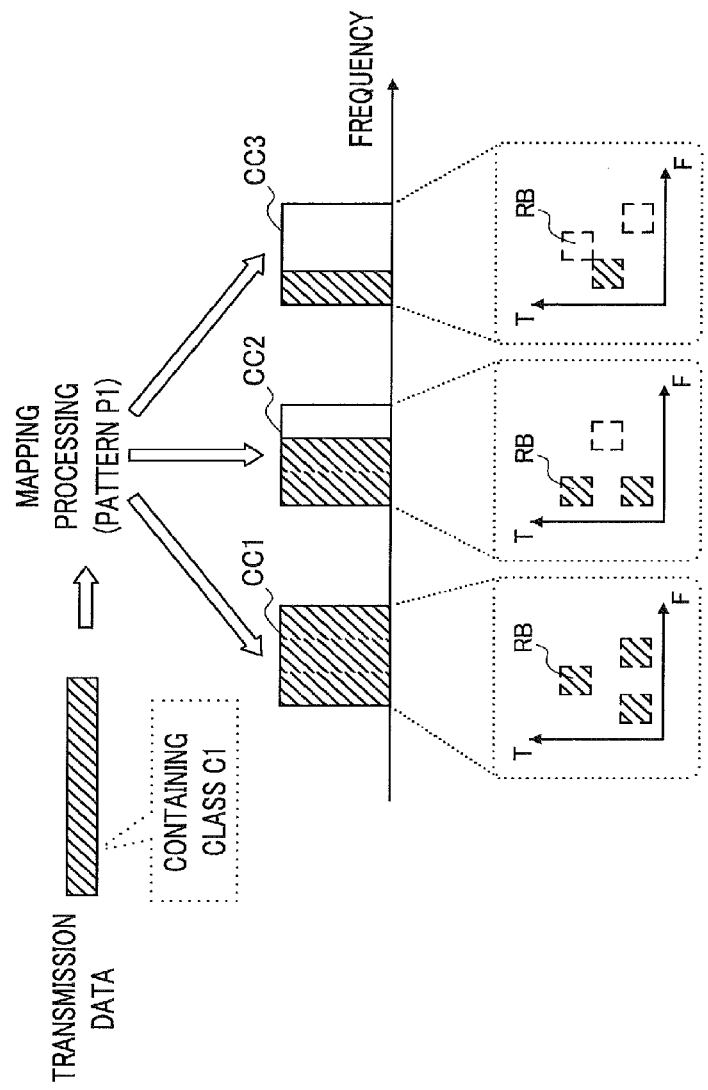

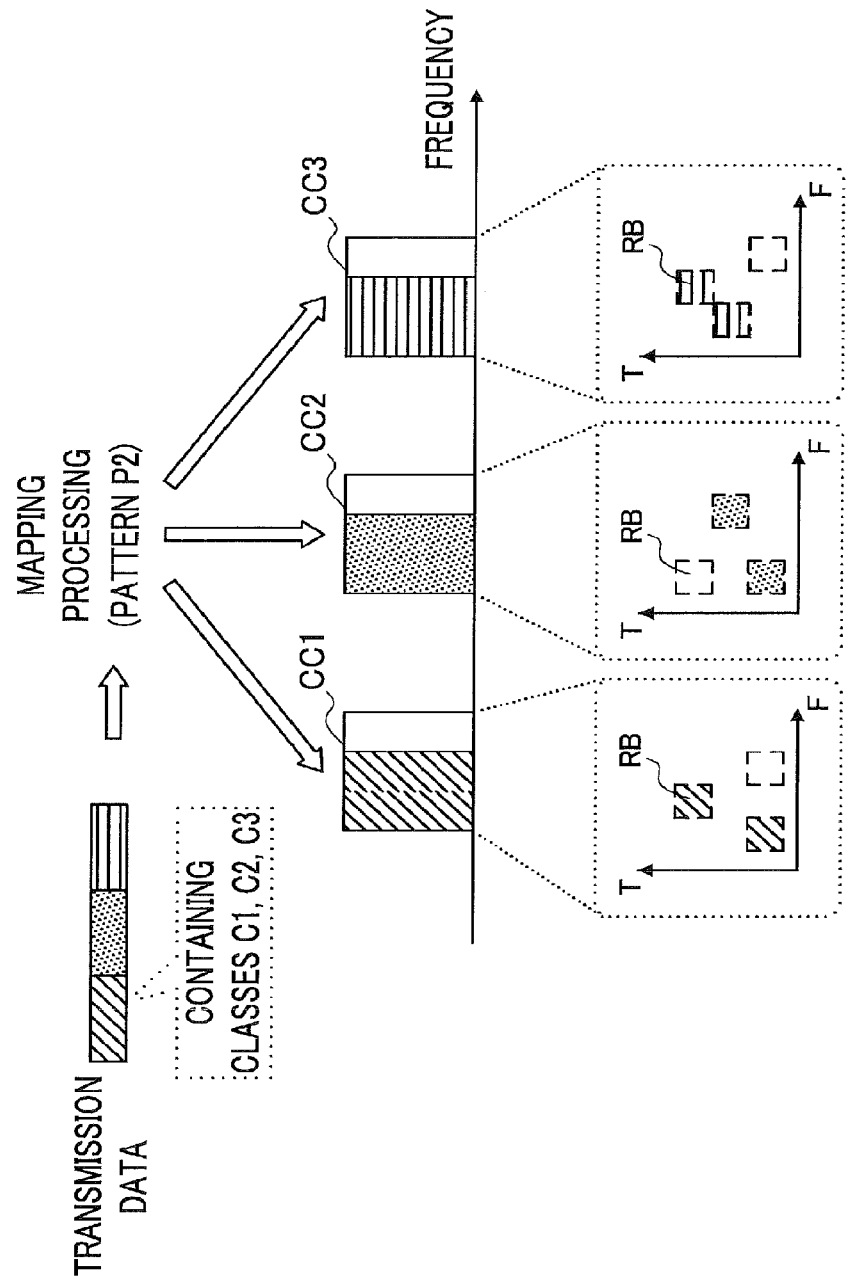

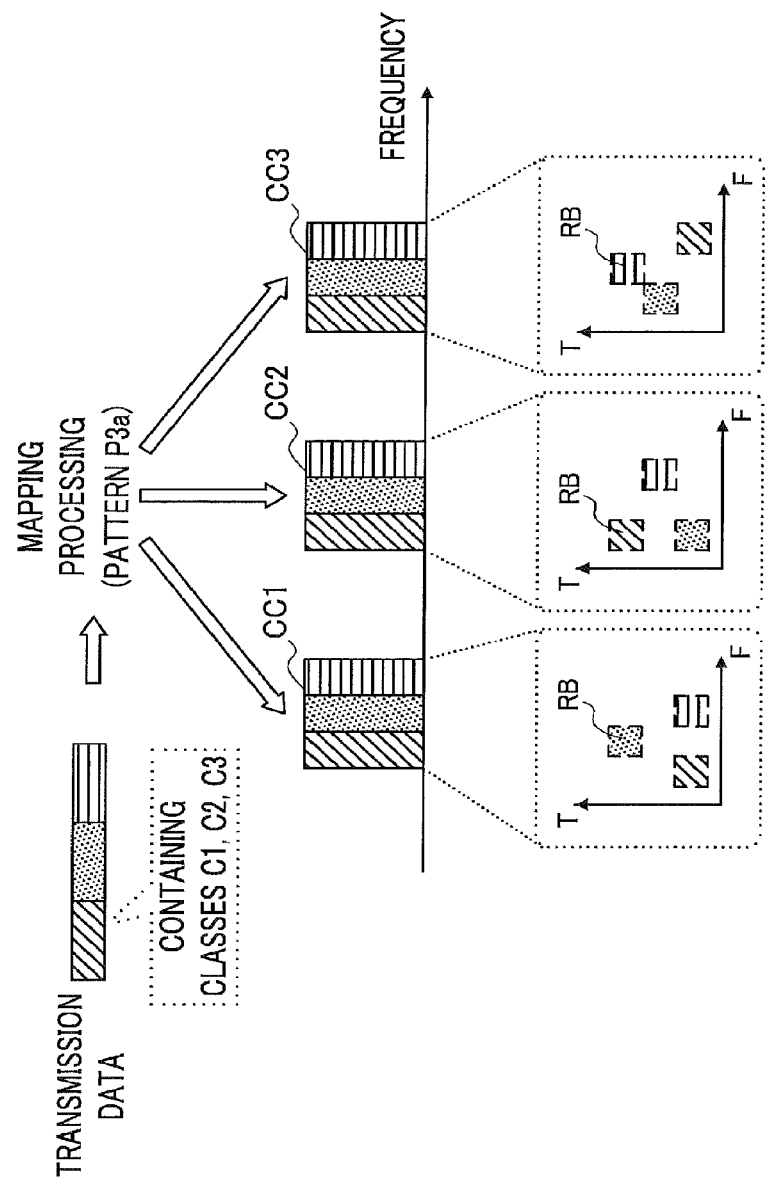

BASE STATION, TERMINAL APPARATUS, COMMUNICATION CONTROL METHOD AND RADIO COMMUNICATION SYSTEM

CROSS-REFERENCE TO RELATED APPLICATIONS

This application is a continuation of U.S. application Ser. No. 14/518,338, filed Oct. 20, 2014, which is a divisional of U.S. application Ser. No. 13/517,255, filed Jun. 20, 2012, which is a national stage application of PCT/JP2011/050014, filed on Jan. 4, 2011, which claims priority to Japanese Patent Application No. 2010-004564, filed on Jan. 13, 2010, the contents of each of which are hereby incorporated by reference in their entirety.

TECHNICAL FIELD

The present invention relates to a base station, a terminal apparatus, a communication control method, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel that is formed by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it can be called asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

The carrier aggregation technology is described in, for example, Non-Patent Literature 1.

CITATION LIST

Non-Patent Literature

Non-Patent Literature 1: "LTE-Advanced and the Evolution to 4G Cellular Systems" [online], [searched on Jan. 5, 2010], Internet <URL:http://www.ece.gatech.edu/research/labs/bwn/ltea/projectdescription.html>.

SUMMARY OF INVENTION

Technical Problem

If the carrier aggregation technology is used, as described above, radio communication can be performed in higher throughput compared to the past. However, under current circumstances in which many users use radio communication services such as packet-based voice calls and real-time video delivery, further contrivances to improve communication characteristics are needed to maintain a high service quality level. In the framework of IEEE802.11n, for example, improving data communication characteristics by interleaving a series of data signals between two channels having the bandwidth of 20 MHz is proposed. However, the interleave between channels in IEEE802.11n is a static interleave following an operation preset for an RF circuit. According to the technique of such an interleave, if quality of a portion of channels deteriorates or a channel with less available resources is present, expected characteristics may not be obtained. If a technology that adaptively interleaves in accordance with communication channel conditions, by contrast, communication characteristics can be improved more reliably in radio communication accompanied by carrier aggregation.

Thus, the present invention provides a novel and improved base station capable of interleaving adaptively in accordance with communication channel conditions in radio communication accompanied by carrier aggregation, a terminal apparatus, a communication control method, and a radio communication system.

Solution to Problem

According to an embodiment of the present invention, there is provided a base station performing radio communication with a terminal apparatus on a communication channel formed by integrating a plurality of component carriers, the base station including: a quality acquisition unit that acquires channel quality of the communication channel for each of the component carriers; and an interleaver that interleaves data signals transmitted on the communication channel in accordance with at least one of the channel quality acquired by the quality acquisition unit and available situations of communication resources for each of the component carriers.

When each of the data signals transmitted on the communication channel is classified into one of two or more classes in accordance with service quality requirements, the interleaver may mix, into one component carrier, a plurality of the data signals each of which is classified into the two or more classes.

When each of the data signals transmitted on the communication channel is classified into one of two or more classes in accordance with service quality requirements, the interleaver may frequency-interleave the data signal classified into one class between the plurality of component carriers in accordance with at least one of the channel quality acquired by the quality acquisition unit and the available situations of communication resources.

The interleaver may not distribute bits of the data signals classified into the class in which the relatively high service quality is required to the component carrier that does not maintain a predetermined quality level.

The interleaver may distribute bits of each of the data signals to one or more component carriers having available resources exceeding a certain ratio present therein and maintaining a predetermined quality level.

When bits of the data signal classified into one class are distributed to two or more component carriers, a percentage of distribution of bits may be decided in accordance with at least one of the channel quality for each of the component carriers and the available situations of communication resources.

When each of the data signals transmitted on the communication channel is classified into one of two or more classes in accordance with service quality requirements, the interleaver may mix, into one resource block, a plurality of the data signals each of which is classified into the two or more classes.

The interleaver may further time-interleave each of the data signals.

The interleaver may further space-interleave each of the data signals by using a plurality of antennas.

According to another embodiment of the present invention, there is provided a terminal apparatus performing radio communication with a base station on a communication channel formed by integrating a plurality of component carriers, the terminal apparatus including: a radio communication unit that transmits/receives data signals interleaved in accordance with at least one of channel quality of the communication channel for each of the component carriers and available situations of communication resources for each of the component carriers to/from the base station.

According to another embodiment of the present invention, there is provided a communication control method to control radio communication with a terminal apparatus on a communication channel formed by integrating a plurality of component carriers from a base station, the method including the steps of: acquiring channel quality of the communication channel for each component carrier; judging, for each component carrier, available situations of communication resources allocated to the radio communication; and interleaving data signals transmitted on the communication channel in accordance with at least one of the channel quality and the available situations of communication resources.

According to another embodiment of the present invention, there is provided a radio communication system containing a base station and a terminal apparatus that perform radio communication with each other on a communication channel formed by integrating a plurality of component carriers, wherein the base station includes: a quality acquisition unit that acquires channel quality of the communication channel for each of the component carriers; and an interleaver that interleaves data signals transmitted on the communication channel in accordance with at least one of the channel quality acquired by the quality acquisition unit and available situations of communication resources for each of the component carriers, and the terminal apparatus includes a radio communication unit that receives the data signals interleaved by the interleaver of the base station from the base station.

Advantageous Effects of Invention

As described above, a base station, a terminal apparatus, a communication control method, and a radio communication system according to the present invention can adaptively interleave in accordance with communication channel conditions.

BRIEF DESCRIPTION OF DRAWINGS

FIG. 7A is an explanatory view illustrating a first example of interleave processing according to an embodiment.

FIG. 7B is an explanatory view illustrating a second example of the interleave processing according to the embodiment.

FIG. 7C is an explanatory view illustrating a third example of the interleave processing according to the embodiment.

FIG. 8 is an explanatory view illustrating a first pattern of mapping between component carriers and QoS classes.

FIG. 9 is an explanatory view illustrating a second pattern of the mapping between component carriers and QoS classes.

FIG. 10A is an explanatory view illustrating a first example of a third pattern of the mapping between component carriers and QoS classes.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Description of Embodiments" will be described in the following order:
1. Overview of Radio Communication System
1-1. Overall Image of System
1-2. Configuration of Communication Resources
1-3. Classification of Service Quality Requirements 2. Configuration Example of Apparatus According to An Embodiment
  2-1. Configuration Example of Terminal Apparatus
  2-2. Configuration Example of Base Station
  2-3. Configuration Example of Interleave Processing
  2-4. Mapping Between Component Carriers and Classes
3. Conclusion 1. Overview of Radio Communication System

[1-1. Overall Image of System]

Figure 1:
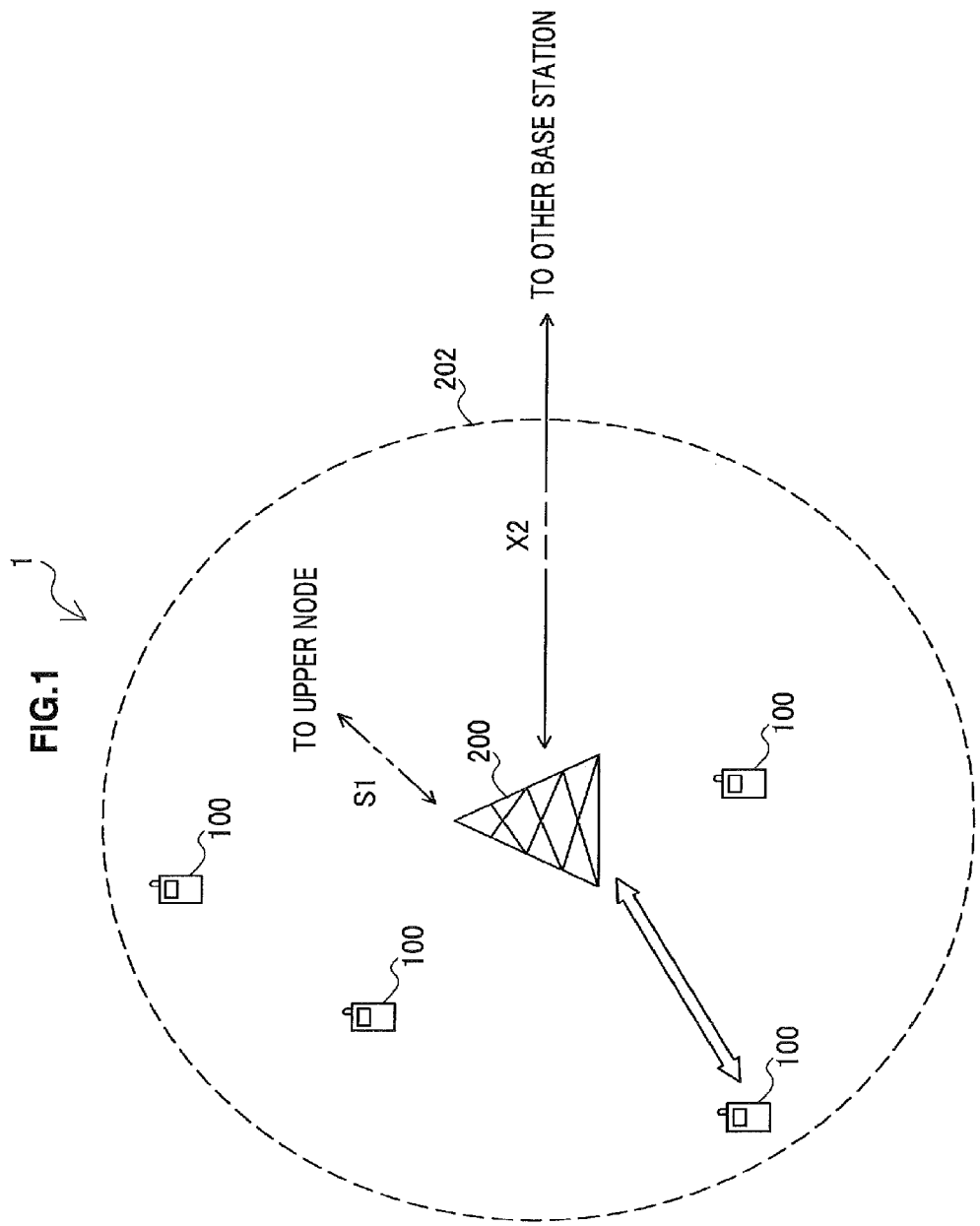
FIG. 1 is a schematic diagram showing an overview of a radio communication system according to an embodiment.

FIG. 1 is a schematic diagram showing an overview of a radio communication system 1 according to an embodiment of the present invention. Reference to FIG. 1 shows that the radio communication system 1 includes one or more terminal apparatuses 100 and a base station 200.

The terminal apparatus 100 is positioned inside a cell 202 in which radio communication services are provided by the base station 200. The terminal apparatus 100 performs data communication with another terminal apparatus inside or outside the cell 202 via the base station 200 on a communication channel formed by combining a plurality of component carriers (that is, by carrier aggregation). The base station 200 provides communication services to the terminal apparatuses 100 positioned inside the cell 202 on a communication channel formed by combining a plurality of component carriers. The base station 200 can also communicate with other base stations via a backbone link (for example, the X2 interface). Further, the base station 200 can also communicate with an upper node such as Serving-Gateway (S-GW) and MME via, for example, the S1 interface.

[1-2. Configuration of Communication Resources]

Figure 2:
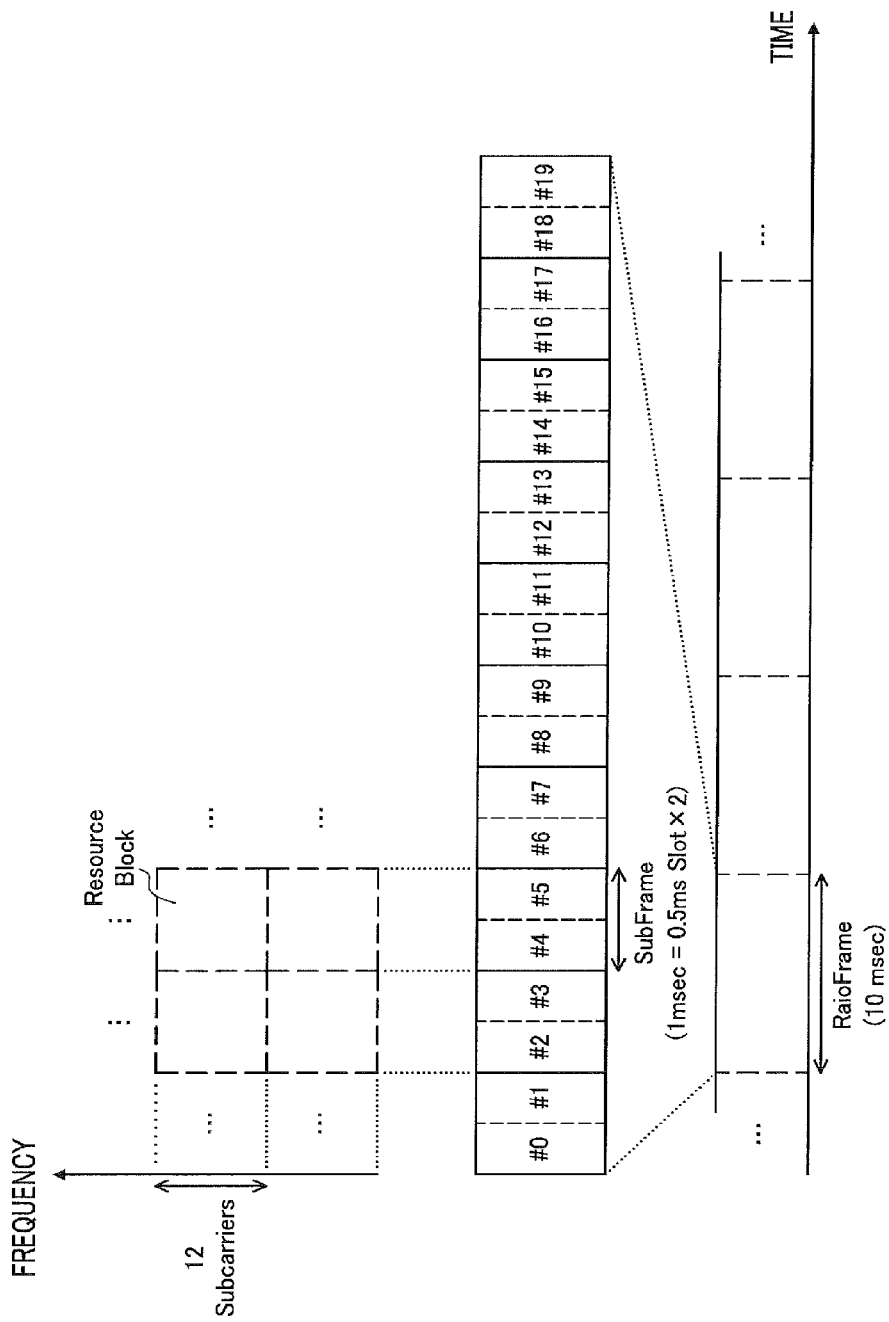
FIG. 2 is an explanatory view exemplifying the configuration of communication resources.

FIG. 2 shows the configuration of communication resources in LTE as an example of the configuration of communication resources to which the present invention can be applied. Reference to FIG. 2 shows that communication resources in LTE are divided into individual radio frames having the length of 10 msec in a time direction. Further, one radio frame contains 10 subframes and one subframe is formed of two slots of 0.5 ms. In LTE, the subframe is the unit in which communication resources are allocated to each terminal apparatus in the time direction. The unit is called a Resource Block. One Resource Block contains 12 subcarriers in a frequency direction. That is, one Resource Block contains a size of 1 msec×12 subcarriers in a time-frequency region. If the bandwidth and the time length are the same, throughput of data communication grows with an increasing number of Resource Blocks allocated for data communication. In the radio communication system 1 shown in FIG. 1, the base station 200 decides allocation of communication resources to each of the terminal apparatuses 100. For example, the base station 200 delivers scheduling information to the terminal apparatus 100 on a broadcast channel of a downlink.

[1-3. Classification of Service Quality Requirements]

In the radio communication system 1, each data signal transmitted on the above communication channel classified into one of two or more classes in accordance with service quality requirements (hereinafter, referred to as QoS (Quality of Service) requirements) of traffic. Two or more classes in accordance with QoS requirements may be, for example, four classes (hereinafter, referred to as QoS classes) shown in Table 1. In Table 1, the class name, attribute examples concerning QoS requirements of the class, and examples of corresponding services are shown for each of the four QoS classes.

TABLE 1

Example of classification

| Class name | Attribute examples concerning QoS requirements | Service examples |
|---|---|---|
| Conversational | Error rate<br>Transfer delay<br>Guaranteed bit rate | VoIP<br>Video conference |
| Streaming | Error rate<br>Transfer delay<br>Guaranteed bit rate | Real-time video delivery |
| Interactive | Error rate | Web access<br>Database search |
| Background | Error rate | E-mail SMS |

First, the first QoS class is the "Conversational" class. For traffic of the "Conversational" class, as an example, three attributes of the error rate, transfer delay, and guaranteed bit rate are defined as QoS requirements to be met.

The error rate can be expressed as, for example, an SDU (Service Data Unit) error ratio or a residual bit error ratio. The SDU error ratio represents the ratio of SDUs in which an error is detected to transmitted SDUs. The residual bit error ratio is the ratio of bits that are not detected on the receiving side to transmitted data bits. The transfer delay is a delay amount permitted during transmission. The guaranteed bit rate refers to the bit rate guaranteed to terminal apparatuses by the radio communication system 1. Instead of the guaranteed bit rate (or in addition to the guaranteed bit rate), the maximum bit rate may be used.

As is understood from Table 1, the radio communication system 1 schedules communication resources for traffic belonging to the "Conversational" class so that the error rate, transfer delay, and guaranteed bit rate do not fall below predetermined reference values. Examples of services corresponding to the "Conversational" class include the VoIP (Voice over IP) and video conference.

The second QoS class is the "Streaming" class. Also for traffic of the "Streaming" class, three attributes of the error rate, transfer delay, and guaranteed bit rate are defined as QoS requirements to be met. However, reference values of QoS requirements concerning these attributes may be different from reference values in the "Conversational" class. Examples of services corresponding to the "Streaming" class include real-time video delivery.

The third QoS class is the "Interactive" class. For traffic of the "Interactive" class, for example, only the error rate is defined as QoS requirements to be met. Examples of services corresponding to the "Interactive" class include Web access and database search.

The fourth QoS class is the "Background" class. Also for traffic of the "Background" class, for example, only the error rate is defined as QoS requirements to be met. However, the reference value of the error rate may be different from the reference value in the "Interactive" class. Examples of services corresponding to the "Background" class include the E-mail and SMS (Short Messaging Service).

Classification of QoS classes shown in Table 1 is only an example. For example, independent QoS classes for control signaling such as IMS (Information Management Signaling) may be defined. Stringent (or high-priority) QoS requirements can be imposed on QoS classes for control signaling than on the above QoS classes for data signals. Into which of these QoS classes to classify each data signal is decided by, for example, individual service applications and is indicated in, for example, the header of a data packet.

Figure 3:
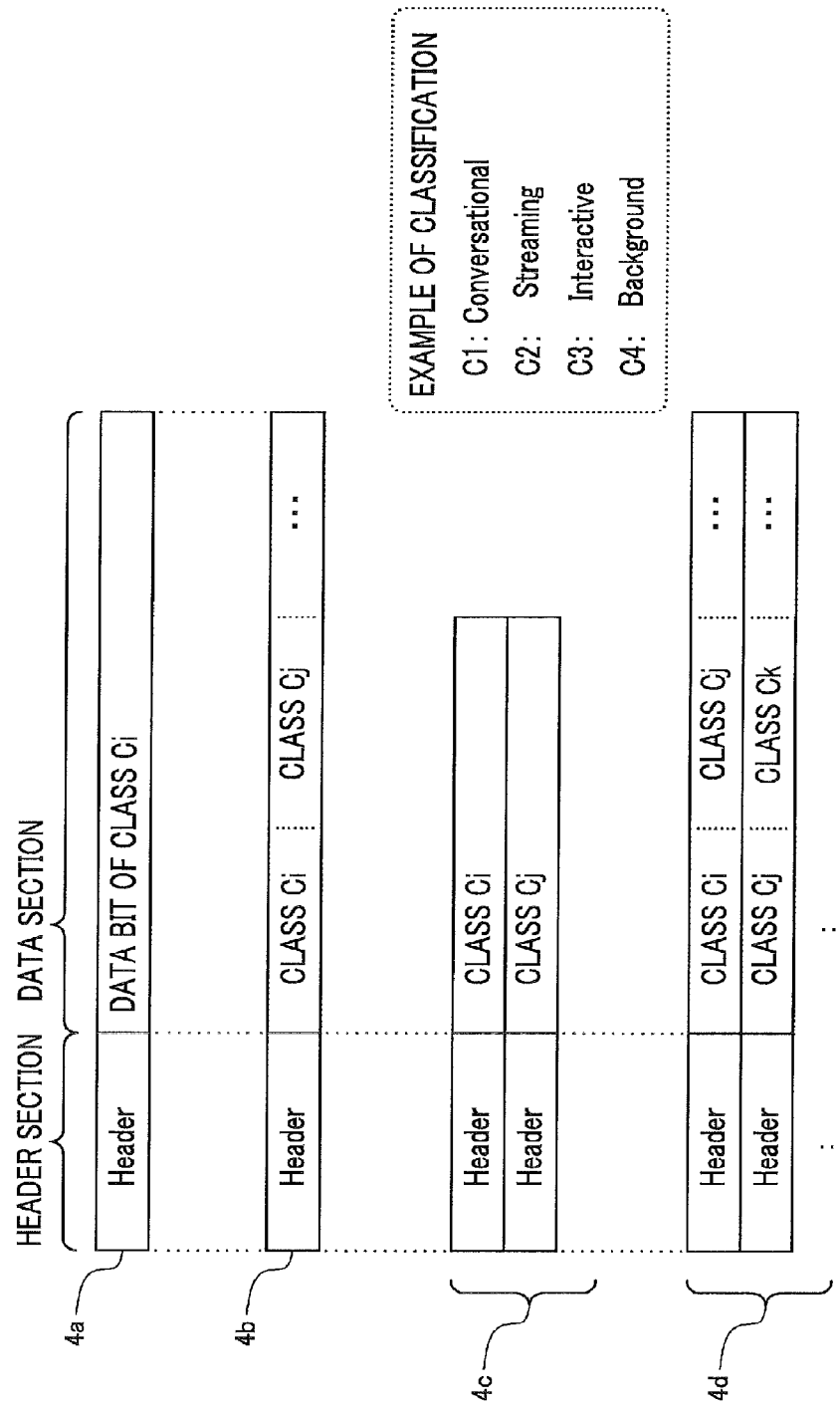
FIG. 3 is an explanatory view illustrating configuration examples of data packets.

FIG. 3 is an explanatory view illustrating configuration examples of data packets that can be transmitted by the radio communication system 1. Reference of FIG. 3 shows four data packets 4a, 4b, 4c, and 4d.

The data packet 4a is constituted of a header section and a data section. The data section of the data packet 4a contains data bits of the class Ci. For example, the class Ci may be one of C1="Conversational", C2="Streaming", and C3="Interactive", and C4="Background". That is, in this case, the data packet 4a is a packet having only a data signal of a single class.

The data section of the data packet 4b contains data bits of the class Ci and the class Cj. For example, the class Cj may also be one (but is different from the class Ci) of C1="Conversational", C2="Streaming", and C3="Interactive", and C4="Background". Thus, data bits of different QoS classes may be contained in one data packet mixedly.

The data packet 4c is a data packet distributed over a plurality of MIMO (Multiple Input Multiple Output) streams. The data section of the first MIMO stream among these streams contains data bits of the class Ci. The data section of the second MIMO stream contains data bits of the class Cj. Thus, data bits of different QoS classes may be contained in each of the data packets distributed over the plurality of MIMO streams. Further, like the data packet 4d, data bits of two or more different QoS classes may be contained in each of data packets distributed over a plurality of MIMO streams.

In the present embodiment, the radio communication system 1 performs radio communication accompanied by carrier aggregation in an environment in which data signals of the plurality of QoS classes can be mixed. Data signals transmitted between the terminal apparatus 100 and the base station 200 are adaptively interleaved depending on communication channel conditions, as will be described in detail in the next paragraph.

2. Configuration Example of Apparatus According to an Embodiment

[2-1. Configuration Example of Terminal Apparatus]

Figure 4:
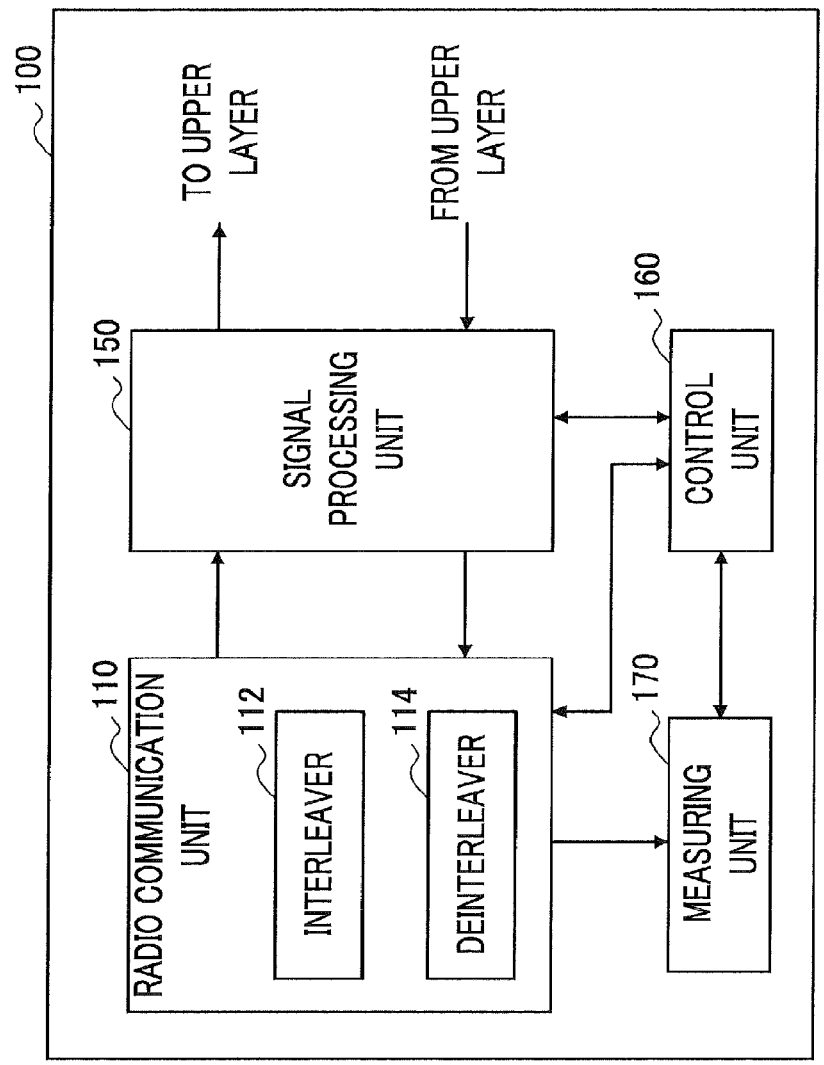
FIG. 4 is a block diagram exemplifying the configuration of a terminal apparatus according to an embodiment.

FIG. 4 is a block diagram exemplifying the configuration of the terminal apparatus 100 according to the present embodiment. Reference to FIG. 4 shows that the terminal apparatus 100 includes a radio communication unit 110, a signal processing unit 150, a control unit 160, and a measuring unit 170.

(Radio Communication Unit)

The radio communication unit 110 performs radio communication with the base station 200 on a communication channel formed by integrating a plurality of component carriers by using the carrier aggregation technology. Data signals transmitted to or received from the base station 200 are, as will be further described below, data signals interleaved in accordance with channel quality for each component carrier or available situations of communication resources for each component carrier.

For example, as shown in FIG. 4, the radio communication unit 110 includes an interleaver 112 and a deinterleaver 114. The interleaver 112 interleaves bit strings of a data signal input from the signal processing unit 150 under the control of the control unit 160. Then, the radio communication unit 110 sends out a data signal interleaved by the interleaver 112 onto a communication channel to the base station 200. On the other hand, the deinterleaver 114 deinterleaves bit strings of a data signal received via a communication channel to the base station 200 under the control of the control unit 160. Then, the radio communication unit 110 outputs a data signal deinterleaved by the deinterleaver 114 to the signal processing unit 150.

(Signal Processing Unit)

The signal processing unit 150 performs signal processing such as decoding and error corrections on a data signal input from the radio communication unit 110. Then, the signal processing unit 150 outputs a processed data signal to an upper layer. The signal processing unit 150 also performs signal processing such as encoding on a data signal input from an upper layer. Then, the signal processing unit 150 outputs a processed data signal to the radio communication unit 110.

(Control Unit)

The control unit 160 controls functions of the terminal apparatus 100 as a whole by using a processing unit such as a CPU (Central Processing Unit) and DSP (Digital Signal Processor). For example, the control unit 160 controls the timing of data communication by the radio communication unit 110 according to scheduling information received by the radio communication unit 110 from the base station 200. The control unit 160 also causes the measuring unit 170 to measure channel quality of each component carrier (more suitably, each Resource Block in each component carrier) by using a reference signal from the base station 200 to transmit a channel quality report to the base station 200 via the radio communication unit 110. The control unit 160 also receives control information about mapping between each component carrier and the QoS class of each data signal from the base station 200 via the radio communication unit 110. The control information may be the same information as the above scheduling information or different information. Then, the control unit 160 controls processing of the interleaver 112 or the deinterleaver 114 of the radio communication unit 110 according to the control information.

(Measuring Unit)

The measuring unit 170 measures channel quality by using a reference signal from the base station 200, for example, under the control of the control unit 160. A measurement result by the measuring unit 170 is converted into a predetermined format by the control unit 160 and transmitted to the base station 200 via the radio communication unit 110. A measurement result of the channel quality is used for mapping between each component carrier and the QoS class of each data signal in the base station 200.

[2-2. Configuration Example of Base Station]

Figure 5:
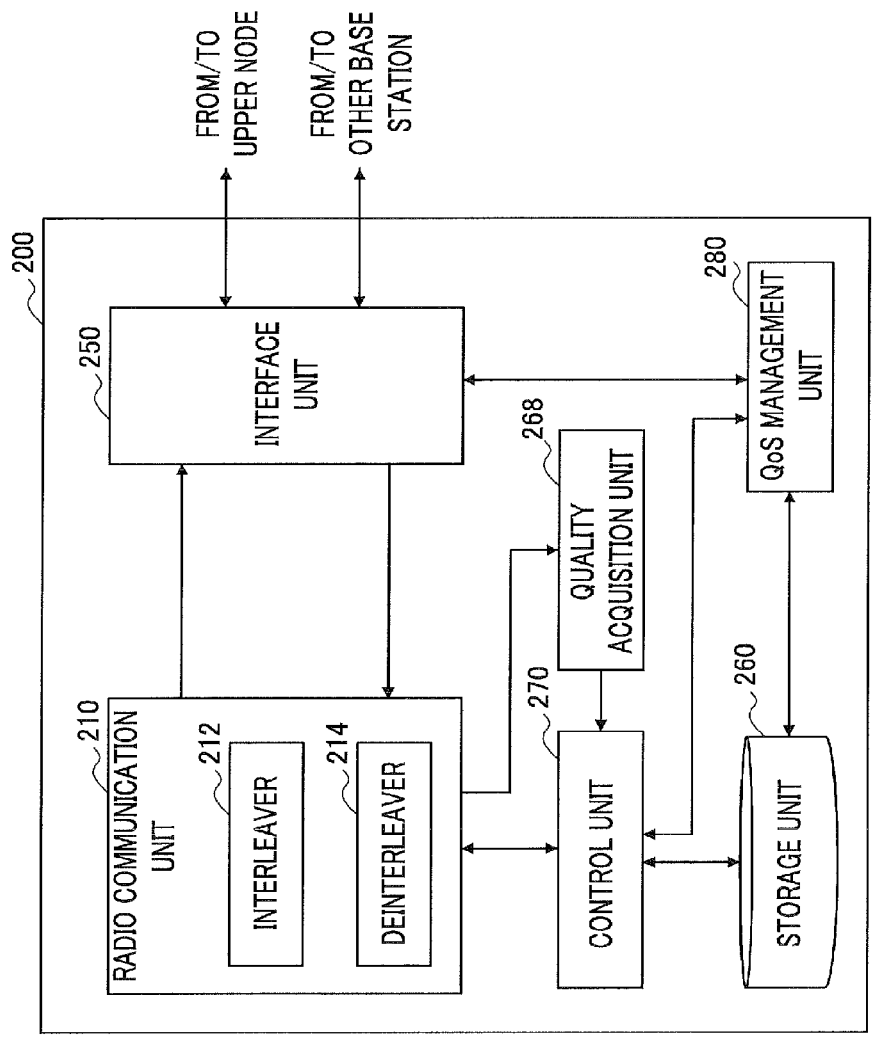
FIG. 5 is a block diagram exemplifying the configuration of a base station according to an embodiment.

FIG. 5 is a block diagram exemplifying the configuration of the base station 200 according to the present embodiment. Reference to FIG. 5 shows that the base station 200 includes a radio communication unit 210, an interface unit 250, a storage unit 260, a quality acquisition unit 268, a control unit 270, and a QoS management unit 280.

(Radio Communication Unit)

The radio communication unit 210 performs radio communication with the terminal apparatus 100 on a communication channel formed by integrating a plurality of component carriers by using the carrier aggregation technology. The radio communication unit 210 includes an interleaver 212 and a deinterleaver 214. The interleaver 212 interleaves bit strings of a data signal input from the interface unit 250 under the control of the control unit 270. Then, the radio communication unit 210 sends out a data signal interleaved by the interleaver 212 onto a communication channel to the terminal apparatus 100. On the other hand, the deinterleaver 214 deinterleaves bit strings of a data signal received via a communication channel to the terminal apparatus 100 under the control of the control unit 270. Then, the radio communication unit 210 outputs a data signal deinterleaved by the deinterleaver 214 to the interface unit 250.

Figure 6:
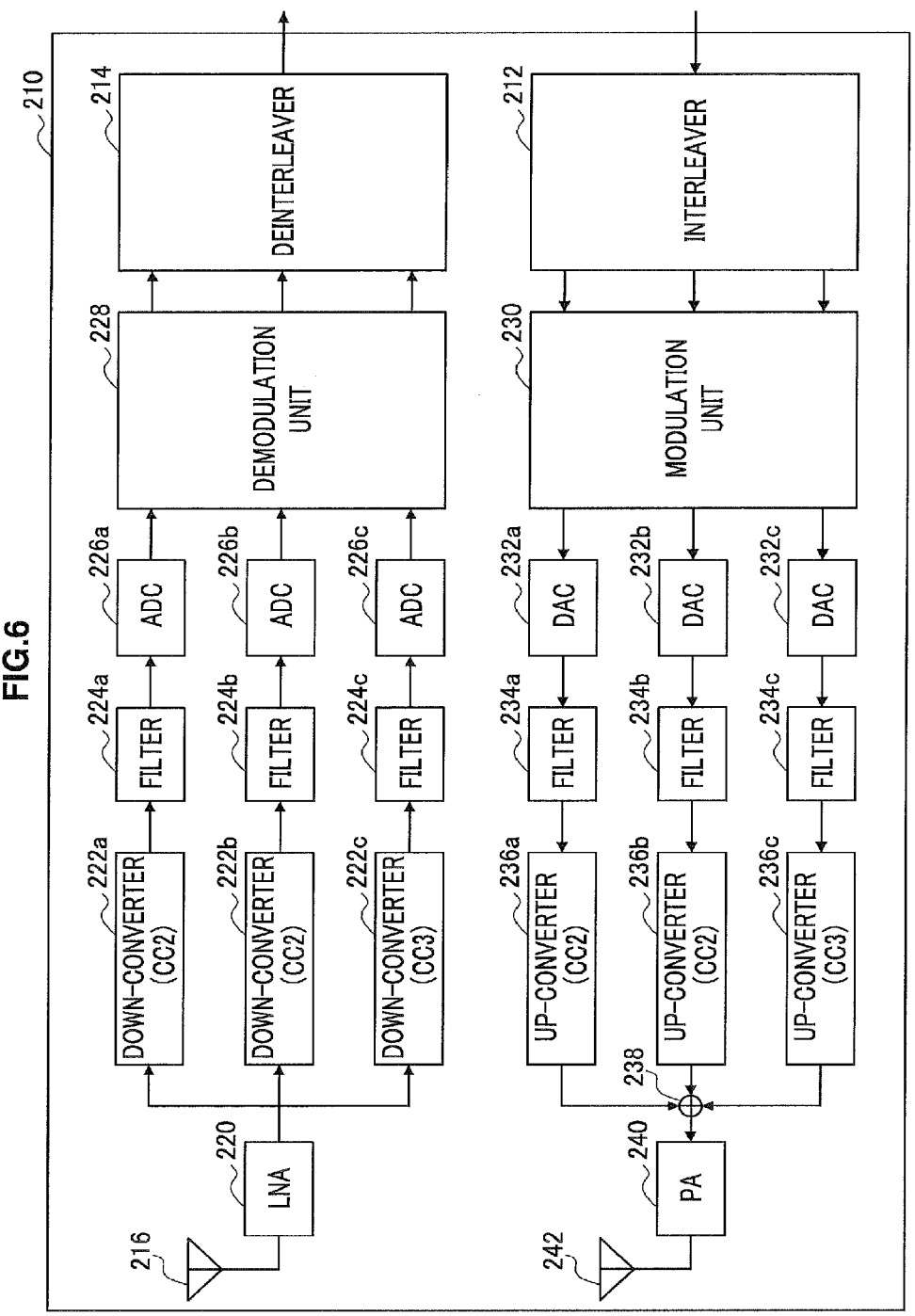
FIG. 6 is a block diagram exemplifying a detailed configuration of a radio communication unit according to an embodiment.

FIG. 6 is a block diagram exemplifying a detailed configuration of the radio communication unit 210. Reference to FIG. 6 shows that the radio communication unit 210 includes an antenna 216, an LNA (Low Noise Amplifier) 220, a plurality of down-converters 222a to 222c, a plurality of filters 224a to 224c, a plurality of ADC (Analogue to Digital Converter) 226a to 226c, a demodulation unit 228, the deinterleaver 214, the interleaver 212, a modulation unit 230, a plurality of DAC (Digital to Analogue Converter) 232a to 232c, further a plurality of filters 234a to 234c, a plurality of up-converter 236a to 236c, a synthesizer 238, a PA (Power Amplifier) 240, and an antenna 242.

When a radio signal transmitted from the terminal apparatus 100 is received, the antenna 216 outputs the received signal to the LNA 220. The LNA 220 amplifies the received signal. The down-converter 222a and the filter 224a separate a baseband signal of a first component carrier (CC1) from the received signal amplified by the LNA 220. Then, the separated baseband signal is converted into a digital signal by the ADC 226a and output to the demodulation unit 228. Similarly, the down-converter 222b and the filter 224b separate a baseband signal of a second component carrier (CC2) from the received signal amplified by the LNA 220. Then, the separated baseband signal is converted into a digital signal by the ADC 226b and output to the demodulation unit 228. Also, the down-converter 222c and the filter 224c separate a baseband signal of a third component carrier (CC3) from the received signal amplified by the LNA 220. Then, the separated baseband signal is converted into a digital signal by the ADC 226c and output to the demodulation unit 228. Subsequently, the demodulation unit 228 generates a data signal by demodulating the baseband signal of each component carrier and outputs the data signal to the deinterleaver 214. The deinterleaver 214 deinterleaves the data signal input from the demodulation unit 228 and outputs the deinterleaved data signal to the signal processing unit 250.

If a data signal is input from the signal processing unit 250, the interleaver 212 interleaves the data signal and outputs the interleaved data signal to the modulation unit 230. The modulation unit 230 modulates the data signal input from the interleaver 212 to generate a baseband signal for each component carrier. The baseband signal of the first component carrier (CC1) among these baseband signals is converted into an analog signal by the DAC 232a. Then, a frequency component corresponding to the first component carrier of a transmission signal is generated by the filter 234a and the up-converter 236a from the analog signal. Similarly, the baseband signal of the second component carrier (CC2) is converted into an analog signal by the DAC 232b. Then, a frequency component corresponding to the second component carrier of the transmission signal is generated by the filter 234b and the up-converter 236b from the analog signal. Also, the baseband signal of the third component carrier (CC3) is converted into an analog signal by the DAC 232c. Then, a frequency component corresponding to the third component carrier of the transmission signal is generated by the filter 234c and the up-converter 236c from the analog signal. Subsequently, frequency components corresponding to the three generated component carriers are synthesized by the synthesizer 238 to form a transmission signal. The PA 240 amplifies the transmission signal and then outputs the transmission signal to the antenna 242. Then, the antenna 242 transmits the transmission signal to the terminal apparatus 100 as a radio signal.

The radio communication unit 110 of the terminal apparatus 100 shown in FIG. 4 is configured in the same manner as the configuration of the radio communication unit 210 of the base station 200 described by using FIG. 6, though requirements such as processing performance are different.

In FIG. 6, an example in which the radio communication unit 210 handles three component carriers is described, but the number of component carriers handled by the radio communication unit 210 may be two or four or more. Also in FIG. 6, an example in which the radio communication unit 210 has one receiving antenna 216 and one transmitting antenna 242 is described. However, the radio communication unit 210 may be configured to have a plurality of the receiving antennas 216 and a plurality of the transmitting antennas 242 to handle a plurality of MIMO (Multiple Input Multiple Output) streams.

(Interface Unit)

Returning to FIG. 5, the description of the example of the configuration of the base station 200 will continue. The interface unit 250 mediates communication between the radio communication unit 210, the control unit 270, and the QoS management unit 280 and an upper node via, for example, the S1 interface illustrated in FIG. 1. The interface unit 250 mediates communication between the radio communication unit 210, the control unit 270, and the QoS management unit 280 and other base stations via, for example, the X2 interface illustrated in FIG. 1.

(Storage Unit)

The storage unit 260 holds CC management data indicating which component carrier is used by each terminal apparatus to perform communication for each terminal apparatus belonging to the cell of the base station 200 by using a storage medium such as a hard disk and semiconductor memory. The CC management data can be updated by the control unit 270 when a new terminal apparatus participates in the cell of the base station 200 or an existing terminal apparatus changes the component carrier. Therefore, the control unit 270 can know which component carrier the terminal apparatus 100 muses by referring to the CC management data.

The storage unit 260 also holds QoS data indicating attribute values such as the error rate, transfer delay, and guaranteed bit rate for each QoS class to be met by traffic. The QoS data is used to decide mapping between each component carrier and the QoS class of each data signal when communication resources are scheduled.

(Quality Acquisition Unit)

The quality acquisition unit 268 acquires channel quality for each component carrier of communication channels to the terminal apparatus 100. For example, the quality acquisition unit 268 may acquire a channel quality report transmitted from the terminal apparatus 100 via the radio communication unit 210. Instead, the quality acquisition unit 268 may acquire channel quality for each component carrier by measuring the power level, error rate and the like of a received signal in the radio communication unit 210. The quality acquisition unit 268 outputs the value of channel quality of each component carrier to the control unit 270.

(Control Unit)

The control unit 270 controls functions of the base station 200 as a whole by using a processing unit such as a CPU and DSP. For example, the control unit 270 schedules communication resources for data transmission by the terminal apparatus 100 based on attribute values for each QoS class to be met by traffic notified from the QoS management unit 280. At this point, the control unit 270 decides mapping between each component carrier and the QoS class of each data signal in accordance with channel quality for each component carrier acquired by the quality acquisition unit 268 and available situations of communication resources for each component carrier. Three typical patterns (six variations) of such mapping will further be described later by citing examples.

The control unit 270 controls interleave processing by the interleaver 212 or deinterleave processing by the deinterleaver 214 of a data signal transmitted on a communication channel to the terminal apparatus 100 in accordance with a result of mapping between each component carrier and the QoS class of each data signal. Three examples of the configuration of interleave processing by the interleaver 212 will further be described later by citing examples.

(QoS Management Unit)

The QoS management unit (also called a QoS manager) 280 commonly manages QoS requirements to be met by traffic by using, for example, QoS data held by the storage unit 260. The QoS management unit 280 notifies the control unit 270 of QoS requirements for data signals to be scheduled before communication resources being scheduled. If there is a possibility that QoS requirements are not met, the QoS management unit 280 may negotiate with other base stations or an upper node so that QoS requirements can be met by changing the path of RAN (Radio Access Network) or utilizing a wire link.

Instead of being arranged in the base station 200, the QoS management unit 280 may be arranged in an upper node of the base station 200. The upper node of the base station 200 is a node corresponding to, for example, a serving gateway or MME.

[2-3. Configuration Example of Interleave Processing]

Next, three examples of the configuration of interleave processing by the interleaver 212 will be described by using FIGS. 7A to 7C. Incidentally, deinterleave processing by the deinterleaver 214 can be configured as processing in the opposite direction of the interleave processing. From the viewpoint of avoiding redundancy of description, a detailed description of deinterleave processing is omitted.

First Example

First, reference to FIG. 7A shows the configuration of the interleaver 212a that frequency-interleaves (CC-interleaves) a data signal among a plurality of component carriers. In the example of FIG. 7A, the interleaver 212a interleaves first to sixth bits equally one bit after another among three component carriers. As a result, the first and fourth bits are distributed to the first component carrier, the second and fifth bits are distributed to the second component carrier, and the third and sixth bits are distributed to the third component carrier.

If, for example, available resources exceeding a certain ratio are present and a plurality of component carriers maintaining a predetermined quality level is available, the control unit 270 may equally distribute each data signal among such component carriers regardless of the QoS class. Accordingly, interleave control is simplified to reduce the load of processing and also an effect of improved link characteristics by interleaving can be expected. Also, for example, the control unit 270 may not distribute a data signal classified into a class in which relatively high service quality is required to a component carrier, among the three component carriers, that does not maintain the predetermined quality level. The class in which relatively high service quality is required may be, for example, the "Conversational" class or the "Streaming" class shown in Table 1. Accordingly, an effect of improved link characteristics by interleaving can be expected from a data signal on which stringent (or high-priority) QoS requirements are imposed while avoiding risk of violating QoS requirements. The control unit 270 can cause the interleaver 212 to perform the above interleave processing by, for example, outputting a control signal S1a to the interleaver 212.

Second Example

Reference to FIG. 7B shows the configuration of the interleaver 212b that time-interleaves (bit-interleaves) before a data signal being frequency-interleaved. In the example of FIG. 7B, the order of the first to fourth bits is rearranged to the order of the fourth, first, third, and second bits. Then, these four bits are frequency-interleaved among three component carriers. As a result, the fourth and second bits are distributed to the first component carrier, the first bit is distributed to the second component carrier, and the third bit is distributed to the third component carrier.

Thus, by performing the time-interleave, in addition to the frequency-interleave, for example, a weakened effect of improved characteristics by frequency-interleaving when the number of available component carriers is smaller (for example, than a predetermined reference value) can be compensated for. Available component carriers mean, for example, component carriers maintaining a predetermined quality level and having sufficient available communication resources. Therefore, if, for example, the number of available component carriers is judged to fall below the predetermined reference value, the control unit 270 may cause the interleaver 212b to time-interleave each data signal.

The pattern of rearranging bits in the time-interleave is, for example, defined as communication specifications in advance. Accordingly, for example, bit strings interleaved by the interleaver 212 of the base station 200 can be deinterleaved by the deinterleaver 114 of the terminal apparatus 100.

Third Example

Reference to FIG. 7C shows the configuration of the interleaver 212c that space-interleaves (stream-interleaves to a plurality of MIMO streams) after a data signal being frequency-interleaved. In the example of FIG. 7C, the first to sixth bits are equally interleaved one bit after another among three component carriers. As a result, the first and fourth bits are distributed to the first component carrier, the second and fifth bits are distributed to the second component carrier, and the third and sixth bits are distributed to the third component carrier. Further, among bits distributed to the first component carrier, the first and fourth bits are distributed to different MIMO streams. Similarly, among bits distributed to the second component carrier, the second and fifth bits are distributed to different MIMO streams. Also, among bits distributed to the third component carrier, the third and sixth bits are distributed to different MIMO streams.

Thus, also by performing the space-interleave, in addition to the frequency-interleave, for example, a weakened effect of improved characteristics by frequency-interleaving when the number of available component carriers is smaller (for example, than a predetermined reference value) can be compensated for. Therefore, if, for example, the number of available component carriers is judged to fall below the predetermined reference value, the control unit 270 may cause the interleaver 212c to space-interleave each data signal to a plurality of MIMO streams using a plurality of MIMO antennas.

The pattern of distributing bits to MIMO streams in the space-interleave is, for example, defined as communication specifications in advance. Accordingly, for example, bit strings interleaved by the interleaver 212 of the base station 200 can be deinterleaved by the deinterleaver 114 of the terminal apparatus 100.

The frequency-interleave, time-interleave, and space-interleave described by using FIGS. 7A to 7C are not limited to combinations described herein and can be used in any combination. For example, the interleaver 212 may be configured to perform all of the frequency-interleave, time-interleave, and space-interleave. Also, other processing may be interposed between the interleave processing. For example, it is clear that encoding processing or the like may be performed in the timing between the time-interleave and the frequency-interleave or between the frequency-interleave and the space-interleave.

[2-4. Mapping Between Component Carriers and Classes]

Next, typical patterns of mapping between each component carrier and the QoS class of each data signal will be described by using FIGS. 8 to 10D.

(First Pattern)

FIG. 8 is an explanatory view illustrating a first pattern (pattern P1) of mapping between each component carrier and the QoS class of each data signal. The first pattern is a pattern that can be adopted when a data signal to be transmitted contains data bits of a single QoS class.

Reference to FIG. 8 shows that the data signal contains only data bits belonging to the class C1. The control unit 270 of the base station 200 distributes such data bits equally or non-equally among component carriers. In the example of FIG. 8, Resource Blocks in the component carriers CC1, CC2, CC3 are scheduled non-equally in the ratio of 3:2:1 respectively. Such a ratio can be decided in accordance with channel quality of each component carrier or available situations of resource (for example, more bits are distributed to a component carrier in good quality or a component carrier with more available resources).

(Second Pattern)

FIG. 9 is an explanatory view illustrating a second pattern (pattern P2) of mapping between each component carrier and the QoS class of each data signal. The second pattern is a pattern that can be adopted when a data signal to be transmitted contains data bits of a plurality of QoS classes.

Reference to FIG. 9 shows that the data signal contains data bits belonging to the classes C1, C2, C3. The control unit 270 of the base station 200 distributes these data bits to each component carrier so that data bits classified into different classes are transmitted on mutually different component carriers. If, for example, QoS requirements of the class C1 are the most stringent (the highest priority), the control unit 270 allocates data bits belonging to the class C1 to the component carrier CC1 in the best channel quality. Also, the control unit 270 allocates data bits belonging to the class C2 whose QoS requirements are the second most stringent (the second highest priority) to the component carrier CC2 in the second best channel quality. Further, the control unit 270 allocates data bits belonging to the class C3 whose QoS requirements are the most lax to the remaining component carrier CC3. According to the second pattern described above, only data signals belonging to one QoS class are transmitted on one component carrier and thus, costs needed for QoS management are reduced.

(Third Pattern)

FIGS. 10A to 10D are explanatory views illustrating a third pattern of mapping between each component carrier and the QoS class of each data signal. The third pattern is, like the second pattern, a pattern that can be adopted when a data signal to be transmitted contains data bits of a plurality of QoS classes. In the third pattern, however, data bits classified into mutually different classes are distributed to the common component carrier. Four variations of the third pattern, that is, patterns P3a to P3d will be described one by one below.

Reference to FIG. 10A (pattern P3a) shows that the data signal contains data bits belonging to the classes C1, C2, C3. The control unit 270 of the base station 200 distributes these data bits to each component carrier in the same ratio. That is, the ratio of data bits distributed to the component carrier CC1 and belonging to the classes C1, C2, C3 is equal to the ratios for the component carriers CC2, CC3. According to the pattern P3a, the distribution of data bits can be decided by the common ratio and thus, mapping processing is simplified and processing costs for scheduling can be reduced. Moreover, due to an effect of the frequency-interleave, better link characteristics can be obtained when compared with a case when data bits belonging to the same class are simply distributed to the same component carrier.

Figure 10B:
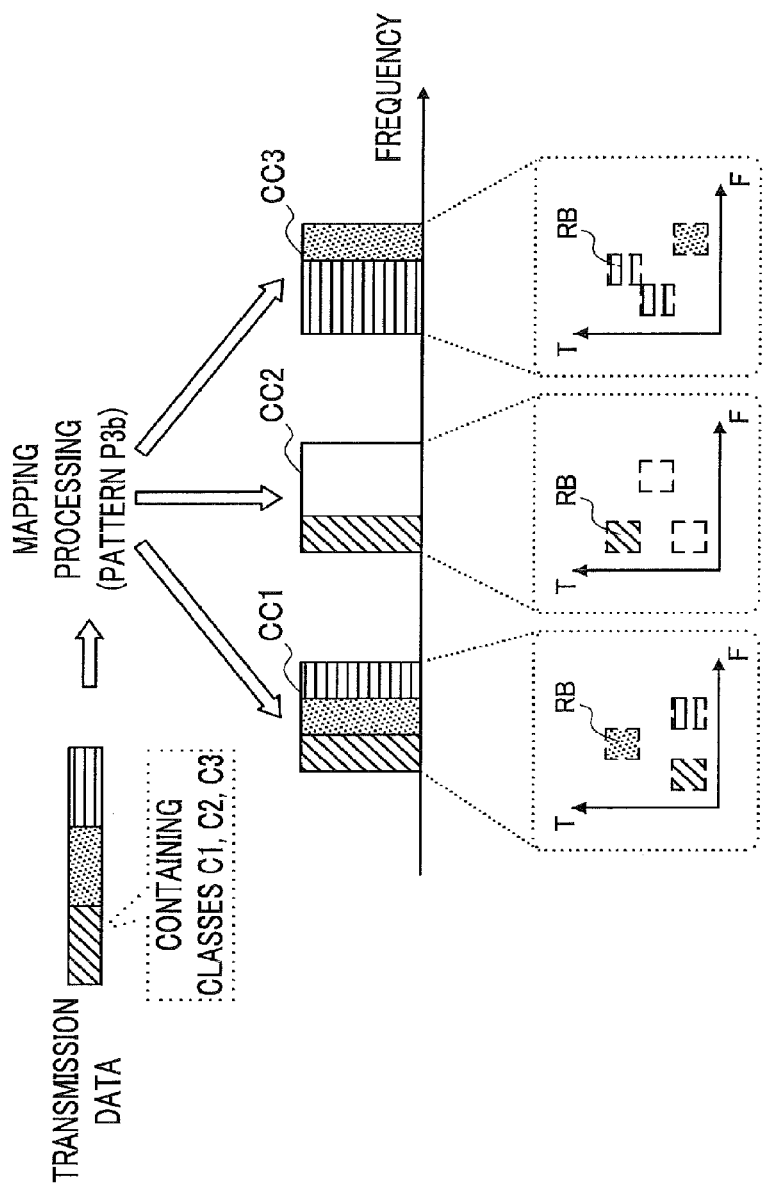
FIG. 10B is an explanatory view illustrating a second example of the third pattern of the mapping between component carriers and QoS classes.

Reference to FIG. 10B (pattern P3b) shows that the data signal contains data bits belonging to the classes C1, C2, C3. The control unit 270 of the base station 200 distributes these data bits in a ratio different from component carrier to component carrier. In the example of FIG. 10B, data bits belonging to the classes C1, C2, C3 are distributed to the component carrier CC1. On the other hand, only data bits belonging to the class C1 are distributed to the component carrier CC2. Also, only data bits belonging to the classes C2, C3 are distributed to the component carrier CC3. According to the pattern P3b, the quantity of communication resources allocated to each component carrier can be increased or decreased in accordance with stringency (priority level) of QoS requirements. Therefore, more flexible scheduling is enabled in order to meet the QoS requirements.

Figure 10C:
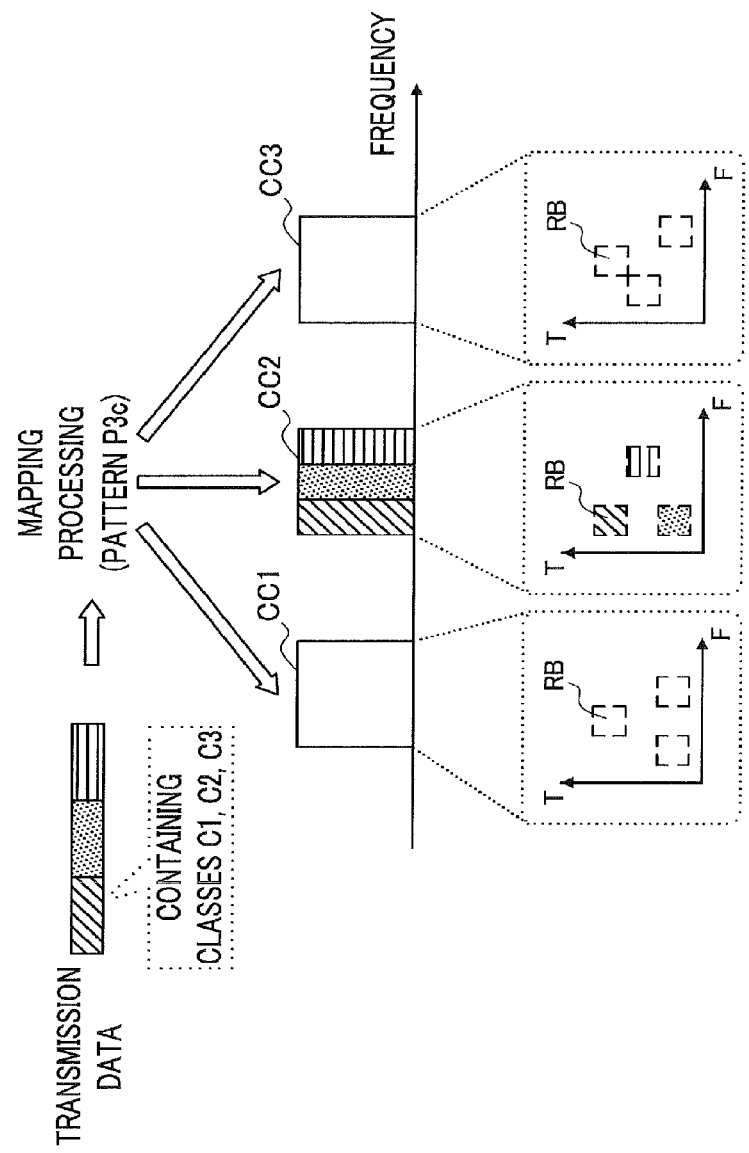
FIG. 10C is an explanatory view illustrating a third example of the third pattern of the mapping between component carriers and QoS classes.

Reference to FIG. 10C (pattern P3c) shows that the data signal contains data bits belonging to the classes C1, C2, C3. The control unit 270 of the base station 200 distributes these data bits to one component carrier. The pattern P3c can be adopted when channel quality of one component carrier is far better than channel quality of other component carriers and sufficient resources are available.

Figure 10D:
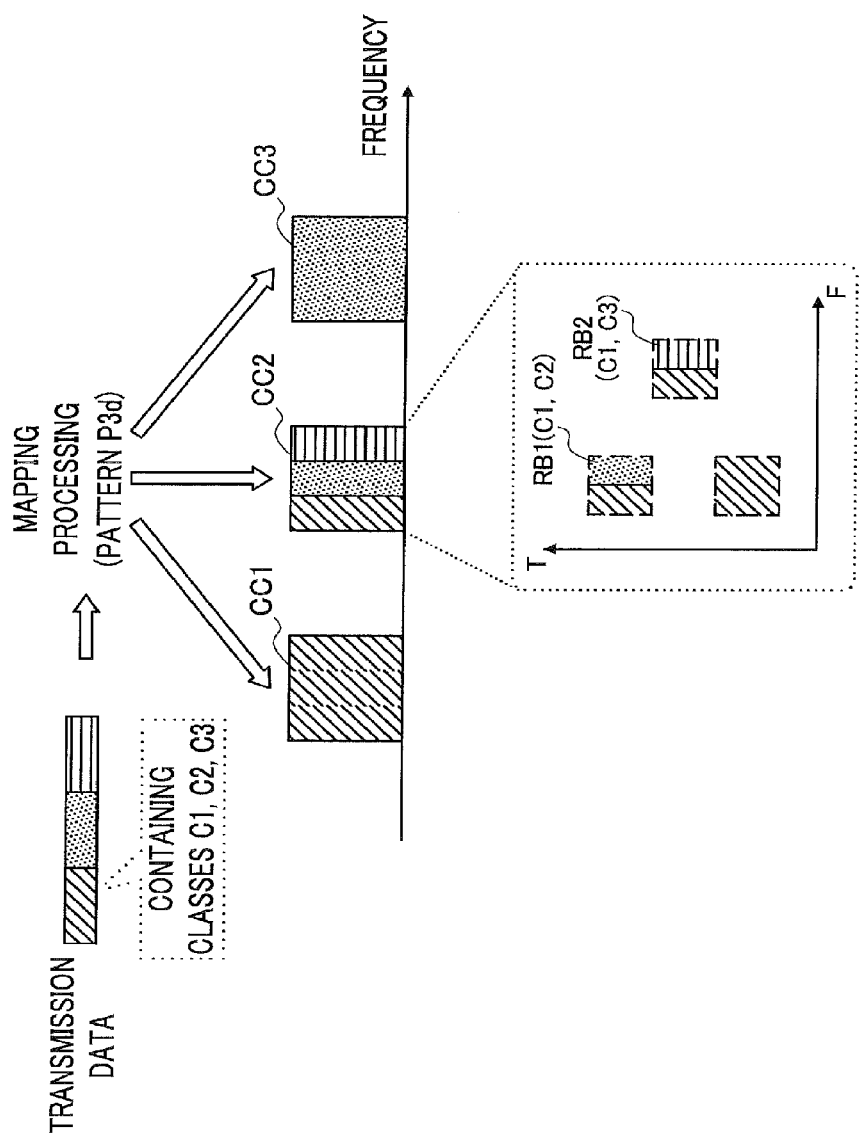
FIG. 10D is an explanatory view illustrating a fourth example of the third pattern of the mapping between component carriers and QoS classes.

Reference to FIG. 10D (pattern P3d) shows that the data signal contains data bits belonging to the classes C1, C2, C3. The control unit 270 of the base station 200 distributes these data bits in a ratio different from component carrier to component carrier. In the pattern P3d, in contrast to the pattern P3b shown in FIG. 10B, the control unit 270 distributes data bits belonging to different classes to one Resource Block. In the example of FIG. 10D, data bits belonging to the classes C1, C2, C3 are distributed to the component carrier CC2. Then, data bits belonging to the classes C1, C2 are distributed to a Resource Block RB1 of the component carrier CC2. Also, data bits belonging to the classes C1, C3 are distributed to a Resource Block RB2 of the component carrier CC2. According to the pattern P3d, more flexible scheduling is enabled in accordance with quality in units of Resource Blocks.

(Selection of Mapping Patterns)

When scheduling communication resources, the control unit 270 can make a selection of which pattern of the above patterns to adopt in accordance with variations in channel quality of each component carrier or available situations of resources for each component carrier. Table 2 shows an example of selection criteria of the mapping pattern. Here, a case when a data signal to be transmitted contains data bits of a plurality of QoS classes will mainly be described.

TABLE 2

Example of selection criteria of the mapping pattern

| Available situations of resources | Variations in quality | |
|---|---|---|
| | All CCs meet predetermined criteria | Some CCs do not meet predetermined criteria |
| All CCs meet predetermined criteria | Case 1-1 (Single class → P1) A plurality of classes → Pattern P2 or P3a | Case 1-2 Pattern P3d |
| Some CCs do not meet predetermined criteria | Case 2-1 Pattern P3b | Case 2-2 Pattern P3c |

In Table 2, available situations of resources are evaluated based on, for example, the availability of resources for each component carrier. Variations in quality are evaluated based on, for example, channel quality for each component carrier obtained through a channel quality report.

As available situations of resources, for example, it is assumed that the availability falls short of a predetermined ratio (that is, sufficient resources are available) for all component carriers. Further, if channel quality of all component carriers exceeds predetermined criteria, the control unit 270 can select the pattern P2 or the pattern P3a (case 1-1). Among these patterns, if it is desirable, for example, to reduce costs needed for QoS management, the pattern P2 is selected. If it is desirable, instead, to improve link characteristics, the pattern P3a may be selected.

If available situations of resources are similar to the case 1-1 and a component carrier whose channel quality does not meet predetermined criteria is present, the control unit 270 can select the pattern P3d (case 1-2).

If a component carrier whose availability exceeds predetermined criteria (that is, sufficient resources are not available) is present and channel quality of all component carriers exceeds predetermined criteria, the control unit 270 can select the pattern P3b (case 2-1). If available situations of resources are similar to the case 2-1 and a component carrier whose channel quality does not meet predetermined criteria is present, the control unit 270 can select the pattern P3c (case 2-2).

The control unit 270 of the base station 200 decides mapping between each component carrier and the QoS class of each data signal based on the selection criteria as an example. Then, the control unit 270 transmits control information concerning the mapping to the terminal apparatus 100 via the radio communication unit 210. The control information concerning the mapping may be, for example, scheduling information delivered on a control channel or broadcast channel of a downlink. The control information concerning mapping suitably represents mapping between a Resource Block contained in each component carrier and the QoS class of each data signal transmitted in the Resource Block. The control information concerning mapping may also contain, for example, identification code that can identify the pattern of the adopted mapping and the pattern of interleaving. Accordingly, the control unit 160 of the terminal apparatus 100 can control the interleaver 112 or the deinterleaver 114 of the radio communication unit 110 according to the control information transmitted from the base station 200. The control unit 270 also controls the interleaver 212 or the deinterleaver 214 of the radio communication unit 210 in accordance with mapping between each component carrier and the QoS class of each data signal.

5. Conclusion

Heretofore, the radio communication system 1 according to an embodiment of the present invention has been described by using FIGS. 1 to 10D. According to the present embodiment, a data signal transmitted on a communication channel formed by carrier aggregation technology is interleaved in the base station 200 in accordance with channel quality for each component carrier and available situations of communication resources for each component carrier. That is, interleaving is performed adaptively in accordance with communication channel conditions and thus, the certainty with which an effect of interleaving can be enjoyed is increased. As a result, communication characteristics are improved to be able to maintain a high service quality. Because the frequency-interleave, time-interleave, and space-interleave are used complementarily, the service quality level can be maintained even in situations when an effect of the frequency-interleave between component carriers cannot be expected much.

It does not matter whether a sequence of processing according to an embodiment described herein is realized by hardware or software. If a sequence of processing or a portion thereof is performed by software, a program constituting the software is stored in a hard disk or a storage medium such as a semiconductor memory and is read into a RAM (Random Access Memory) during execution before being executed by a processing unit such as a CPU and DSP.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST

1 Radio communication system
100 Terminal apparatus
110 Radio communication unit
160 Control unit
200 Base station
210 Radio communication unit
212 Interleaver
214 Deinterleaver
268 Quality acquisition unit
270 Control unit
280 QoS management unit

The invention claimed is:
1. A base station that performs radio communication with a user equipment on a communication channel including a plurality of component carriers, the base station comprising:
 circuitry configured to, for each data signal of a plurality of data signals,
  classify the data signal to at least one of a plurality of classes according to a service quality;

assign the data signal to at least one component carrier of the plurality of component carriers based on the class of the data signal and the service quality; and allocate at least one bit of the data signal to the at least one component carrier in which the data signal is assigned.

2. The base station according to claim 1, wherein the circuitry is configured to, for a first data signal that includes voice data, classify the first data signal to a component carrier with a highest service quality of the plurality of component carriers.

3. The base station according to claim 1, wherein
the plurality of classes correspond to quality of service (QoS) classes,
a first data signal of the plurality of data signals includes a plurality of data bits, the first data signal is classified to more than one class of the plurality of classes, and
the plurality of data bits correspond to a plurality of QoS classes.

4. The base station according to claim 1, wherein the circuitry is configured to allocate the at least one bit of the data signal based on an assignment of the data signal for an uplink transmission timing of the user equipment.

5. The base station according to claim 1, wherein the circuitry is configured to allocate the at least one bit of the data signal based on an assignment of the data signal for a downlink transmission timing of the user equipment.

6. The base station according to claim 1, wherein the circuitry is configured to acquire service quality information of the communication channel for each component carrier of the plurality of component carriers.

7. The base station according to claim 6, wherein the circuitry classifies the data signal to the at least one of the plurality of classes according to quality of service (QoS) requirements of the data signal and the acquired service quality information.

8. The base station according to claim 1, wherein the circuitry is configured to mix the plurality of component carriers to form the communication channel.

9. The base station according to claim 1, wherein
the user equipment is a first user equipment of a plurality of user equipment, and
when the base station performs radio communication with the plurality of user equipment, the circuitry is configured to assign the data signal to the at least one component carrier based on the class of the data signal, the service quality and quality of service (QoS) requirements of the first user equipment corresponding to the data signal.

10. The base station according to claim 1, wherein
the base station provides coverage in a primary cell,
the user equipment is a first user equipment of a plurality of user equipment, and
when the base station performs radio communication with the plurality of user equipment, the circuitry is configured to assign the data signal to the at least one component carrier based on the class of the data signal, the service quality and a traffic volume of the primary cell.

11. A system, comprising:
circuitry for a base station, the circuitry configured to, for each data signal of a plurality of data signals for communication between the base station and a user equipment on a communication channel including a plurality of component carriers,
classify the data signal to at least one of a plurality of classes according to a service quality;
assign the data signal to at least one component carrier of the plurality of component carriers based on the class of the data signal and the service quality; and
allocate at least one bit of the data signal to the at least one component carrier in which the data signal is assigned.

12. A user equipment that performs radio communication with a base station on at least a downlink communication channel including a plurality of component carriers, the user equipment comprising:
circuitry configured to
receive a data signal on the downlink communication channel, the data signal having been classified to at least one of a plurality of classes according to a service quality and assigned to at least one component carrier of the plurality of component carriers based on the class of the data signal and the service quality, and at least one bit of the data signal received on the downlink communication channel having been allocated to the at least one component carrier in which the data signal is assigned.

13. The user equipment according to claim 12, wherein the circuitry receives, on the downlink communication channel, a first data signal that includes voice data that is classified to a component carrier with a highest service quality of the plurality of component carriers.

14. The user equipment according to claim 12, wherein
the plurality of classes correspond to quality of service (QoS) classes,
a first data signal of the plurality of data signals includes a plurality of data bits, the first data signal is classified to more than one class of the plurality of classes, and
the plurality of data bits correspond to a plurality of QoS classes.

15. The user equipment according to claim 12, wherein the at least one bit of data of the data signal is allocated based on an assignment of the data signal for a downlink transmission timing of the user equipment.

16. The user equipment according to claim 12, wherein the data signal is classified to the at least one of the plurality of classes according to quality of service (QoS) requirements of the data signal and service quality information for each component carrier of the plurality of component carriers.

17. The user equipment according to claim 12, wherein the data signal is assigned to the at least one component carrier based on the class of the data signal, the service quality and quality of service (QoS) requirements of the user equipment.

18. The user equipment according to claim 12, wherein
the base station provides coverage in a primary cell, and
the data signal received in the downlink communication channel is assigned to the at least one component carrier based on the class of the data signal, the service quality and a traffic volume of the primary cell.

19. The user equipment according to claim 12, wherein the base station mixes the plurality of component carriers to form the communication channel.

20. A system, comprising:
circuitry for a user equipment, the circuitry configured to
receive a data signal from a base station on the downlink communication channel including a plurality of component carriers, the data signal having been classified to at least one of a plurality of classes according to a service quality and assigned to at least one component carrier of the plurality of component carriers based on the class of the data signal and the service quality, and at least one bit of the data signal received on the downlink communication channel having been allocated to the at least one component carrier in which the data signal is assigned.

* * * * *